(12) United States Patent
Yoshida

(10) Patent No.: US 11,875,076 B2
(45) Date of Patent: Jan. 16, 2024

(54) PRINTING APPARATUS THAT PERFORMS PRINTING BY SELECTING, FROM PLURALITY OF TEMPLATES STORED IN ADVANCE, A TEMPLATE TO ALLOCATE A PRINT DATA OBJECT

(71) Applicant: BROTHER KOGYO KABUSHIKI KAISHA, Nagoya (JP)

(72) Inventor: Kiichi Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/193,515

(22) Filed: Mar. 30, 2023

(65) Prior Publication Data

US 2023/0315365 A1   Oct. 5, 2023

(30) Foreign Application Priority Data

Mar. 31, 2022   (JP) ................. 2022-058377

(51) Int. Cl.
*G06F 3/12* (2006.01)
*G06K 7/14* (2006.01)
*G06F 3/06* (2006.01)

(52) U.S. Cl.
CPC .......... *G06F 3/1257* (2013.01); *G06F 3/1204* (2013.01); *G06K 7/1413* (2013.01); *G06F 3/0682* (2013.01)

(58) Field of Classification Search
None
See application file for complete search history.

(56) References Cited

U.S. PATENT DOCUMENTS

| 10,642,543 | B2 * | 5/2020 | Ishii | G01G 23/18 |
| 2014/0146333 | A1 * | 5/2014 | Shiohara | G06F 3/1243 |
| | | | | 358/1.13 |
| 2019/0299656 | A1 * | 10/2019 | Kako | B41J 3/46 |
| 2020/0272383 | A1 | 8/2020 | Kusumoto | |
| 2021/0268809 | A1 * | 9/2021 | Miyashita | G10L 15/22 |
| 2021/0303227 | A1 * | 9/2021 | Oshima | G06F 3/1257 |

FOREIGN PATENT DOCUMENTS

| JP | 2020-140299 A | 9/2020 |
| JP | 2020-161990 A | 10/2020 |

* cited by examiner

*Primary Examiner* — Haris Sabah
(74) *Attorney, Agent, or Firm* — KENEALY VAIDYA LLP

(57) ABSTRACT

Printing apparatus includes a controller configured to execute a first selection reception process of receiving selection of a first template, a first print data acquisition process of acquiring first print data, a first incorporation process of incorporating the first print data into a first print object of the first template, a first printing process of generating a first printed matter by the first template, a second selection reception process of receiving selection of a second template, an association determination process of determining whether a second print object satisfy a predetermined association rule with respect to the first print object, a second incorporation process of, when it is determined that the second print object satisfy the predetermined association rule, incorporating the first print data into the second print object of the second template, and a second printing process of generating a corresponding second printed matter by the second template.

6 Claims, 10 Drawing Sheets

FIG. 3

| TEMPLATE INFORMATION ||||
|---|---|---|---|
| MAIN BODY INFORMATION ||||
| TEMPLATE ID | WIDTH | LENGTH | THE NUMBER OF OBJECTS |
| 001 | 36mm | 50mm | 4 |
| IMAGE INFORMATION A ||||
| IMAGE FILE NAME | POSITION X | POSITION Y | DATA TYPE |
| Shoho.bmp | 160dot | 10dot | BITMAP IMAGE |
| IMAGE INFORMATION B ||||
| IMAGE FILE NAME | POSITION X | POSITION Y | DATA TYPE |
| Hospital.bmp | 20dot | 230dot | BITMAP IMAGE |

| OBJECT INFORMATION A |||||
|---|---|---|---|---|
| OBJECT NAME | POSITION X | POSITION Y | LONGITUDINAL SIZE | LATERAL SIZE | DATA TYPE |
| Text_a | 15dot | 70dot | 20dot | 150dot | TEXT |
| OBJECT INFORMATION B ||||||
| OBJECT NAME | POSITION X | POSITION Y | LONGITUDINAL SIZE | LATERAL SIZE | DATA TYPE |
| Text_b | 15dot | 95dot | 20dot | 150dot | TEXT |
| OBJECT INFORMATION C ||||||
| OBJECT NAME | POSITION X | POSITION Y | LONGITUDINAL SIZE | LATERAL SIZE | DATA TYPE |
| Text_c | 15dot | 120dot | 20dot | 150dot | TEXT |
| OBJECT INFORMATION D ||||||
| OBJECT NAME | POSITION X | POSITION Y | LONGITUDINAL SIZE | LATERAL SIZE | DATA TYPE |
| BC_1 | 260dot | 160dot | 80dot | 110dot | TWO-DIMENSIONAL BARCODE |

PRINTING APPARATUS THAT PERFORMS PRINTING BY SELECTING, FROM PLURALITY OF TEMPLATES STORED IN ADVANCE, A TEMPLATE TO ALLOCATE A PRINT DATA OBJECT

REFERENCE TO RELATED APPLICATIONS

This application claims priority from Japanese Patent Application No. 2022-058377 filed on Mar. 31, 2022. The entire content of the priority application is incorporated herein by reference.

BACKGROUND ART

In related art, for example, there is known printing apparatus that performs printing by selecting, from a plurality of templates stored in advance, one template designated by a user, and allocating, to the template, print data input by the user.

When the user uses the printing apparatus that stores the plurality of templates as described above, printing may be desired to be performed by using the same print data in common for the plurality of different templates. In the related art described above, such a need is not particularly considered, so that it is necessary to input the print data for each template each time while performing switching between the plurality of templates, and an operation is complicated.

DESCRIPTION

The present disclosure provides printing apparatus capable of reducing an operation burden on a user when printing is desired to be performed by using the same print data in common for a plurality of different templates.

According to an aspect of the present disclosure, printing apparatus for generating a printed matter by using a template in which a print object is allocated, the printing apparatus including: a first storage device, the first storage device being configured to include a first template in which a first print object is allocated and a second template in which a second print object is allocated, the first print object being configured to be incorporated into the first template, the second print object being configured to be incorporated into the second template; a second storage device; a printing device; and a controller. The controller is configured to execute: a first selection reception process of receiving selection of the first template stored in the first storage device; a first print data acquisition process of acquiring, from an outside of the controller, first print data for a first printed matter to be generated by using the first template, and storing the first print data in the second storage device; a first incorporation process of incorporating the first print data as object data for the first print object into the first print object of the first template selected in the first selection reception process; a first printing process of performing, by using the first template in which the first print data is incorporated in the first incorporation process, printing by the printing device, thereby generating the first printed matter; a second selection reception process of receiving, after the first printing process, selection of the second template stored in the first storage device; an association determination process of determining whether the second print object of the second template selected in the second selection reception process satisfies a predetermined association rule with respect to the first print object of the first template selected in the first selection reception process; a second incorporation process of, when it is determined in the association determination process that the second print object satisfies the predetermined association rule with respect to the first print object, incorporating the first print data stored in the second storage device, as object data for the second print object into the second print object of the second template; and a second printing process of performing, by using the second template in which the first print data is incorporated in the second incorporation process, printing by the printing device, thereby generating a corresponding second printed matter.

In the aspect of the present disclosure, during generation of the second printed matter after the generation of the first printed matter, first, the second selection reception process is performed by the controller to receive the selection of the second template selected by the user among the plurality of templates stored in the first storage device. Then, the association determination process is executed to determine whether the first print object and the second print object that is able to be incorporated into the second template satisfy the predetermined association rule. When it is determined that the association rule is satisfied, the second incorporation process is executed, the first print data stored in the second storage device is read out, and the read first print data is incorporated into the second print object of the second template as the object data for the second print object that is able to be incorporated into the second template. Thereafter, in the second printing process, printing is performed by the printing device by using the second template in which the first print data is incorporated as described above, and the second printed matter is thereby generated.

In the aspect of the present disclosure, after the first printed matter is generated by incorporating the first print data into the first template as described above, it is possible to generate the second printed matter by incorporating the first print data into the second template without inputting the first print data again. According to the aspect of the present disclosure, it is possible to reduce the operation burden on the user when the printing is desired to be performed by using the same print data in common for the plurality of different templates. It is also possible to prevent occurrence of an error that contents partially different are erroneously input when the same print data is repeatedly input.

FIG. 3 is an explanatory diagram showing an example of template information.

Hereinafter, an aspect of the present disclosure will be described with reference to drawings. The drawings are used to describe technical features that may be used by the present disclosure. A configuration of a device, a flowchart of various processes, and the like described therein are not intended to limit the present disclosure thereto and are merely explanatory examples.

<Printing Apparatus>

A schematic configuration of printing apparatus 18 according to the aspect of the present disclosure will be described with reference to FIG. 1. In this example, the printing apparatus 18 is a label printer that prints, on a tape M that is a long printing medium, a character such as a letter, a symbol, or a graphic, to generate a print label that can be attached. The print label is an example of a printed matter. The printing apparatus 18 can edit a label image indicating a printed content of the print label.

Figure 1:
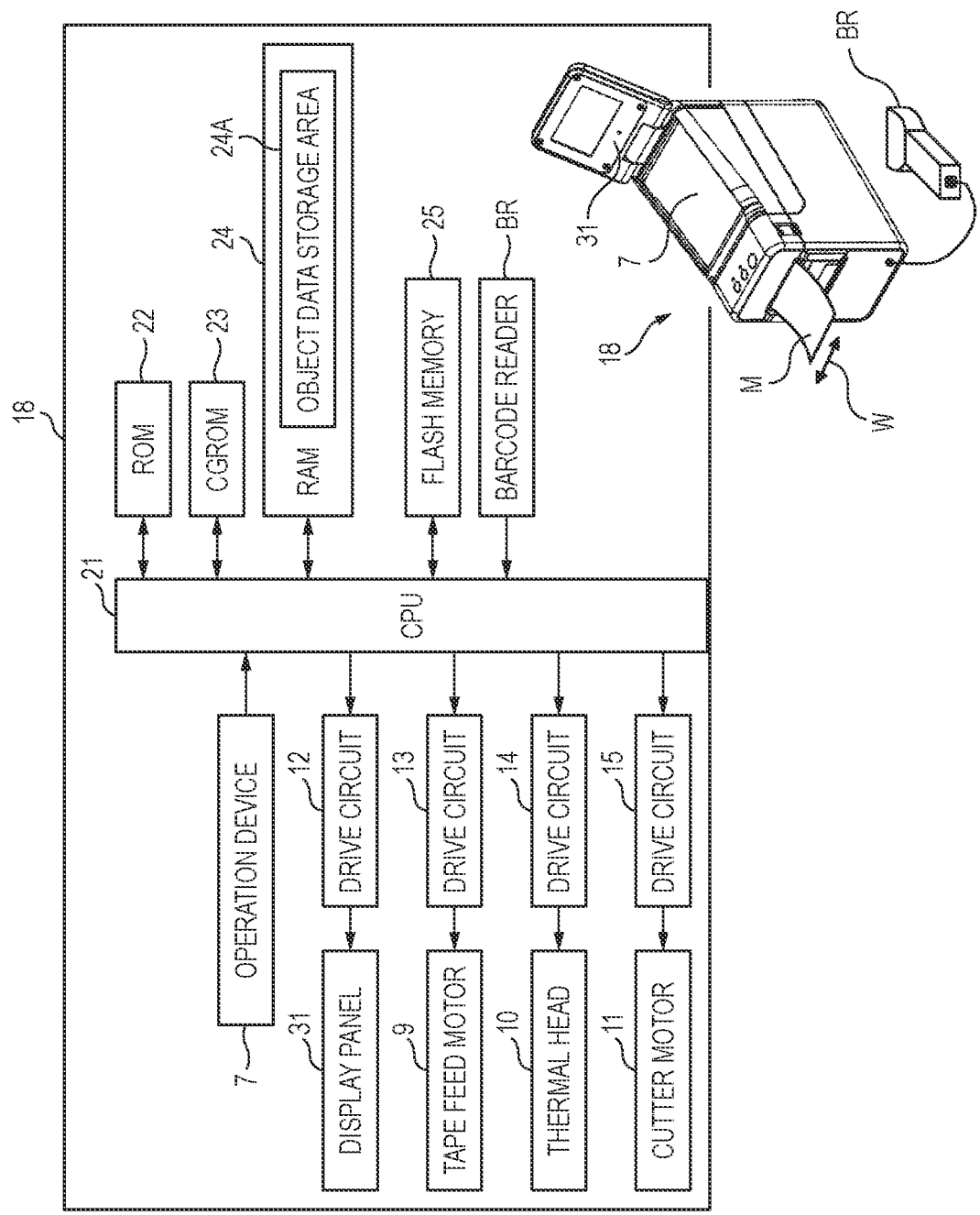
FIG. 1 is a block diagram showing a configuration of printing apparatus.

In FIG. 1, the printing apparatus 18 includes a CPU 21, a ROM 22, a CGROM 23, a RAM 24, and a flash memory 25. The ROM 22, the CGROM 23, the RAM 24, and the flash memory 25 are electrically connected to the CPU 21. The ROM 22 stores various programs or the like necessary for controlling the printing apparatus 18. The CPU 21 performs various calculations based on these programs. The CPU 21 and the ROM 22 are an example of a controller.

In the CGROM 23, printing dot pattern data for printing various characters are classified by format and size and stored in association with code data. The RAM 24 is provided with a plurality of storage areas, and temporarily stores various data. For example, the plurality of storage areas include an object data storage area 24A in which object data to be described later is stored, a print buffer (not shown) in which an appropriate printing dot pattern is stored, and the like. The object data storage area 24A is an example of a second storage device.

The flash memory 25 stores a plurality of templates T in which print objects (details thereof will be described later) are allocated in a predetermined mode. The flash memory 25 is an example of a first storage device. For each of the templates T, for example, a width W of the tape M, the number of objects, and the like are defined in association with each ID of template information to be described later. The width W is a width of the tape M that is the printing medium. The flash memory 25 further stores object information of an object 115. Details thereof will be described later.

As shown in FIG. 1, the printing apparatus 18 further includes an operation device 7, a display panel 31, and drive circuits 12 to 15. The operation device 7 and the drive circuits 12 to 15 are electrically connected to the CPU 21. The operation device 7 is used by an operator to input various data or instructions. The operation device 7 is, for example, a touch panel. The operation device 7 is used when a user inputs object data such as text data. The operation device 7 may be another configuration such as a switch or a dial as long as various instructions can be input.

The display panel 31 is, for example, a liquid crystal display (LCD). The display panel 31 can display an input screen 33 (see FIG. 4 to be described later). The drive circuit 12 is an electronic circuit that outputs a character or the like to the display panel 31. The drive circuit 13 is an electronic circuit that drives a tape feed motor 9 which conveys the tape M. The drive circuit 14 is an electronic circuit that drives a thermal head 10. The thermal head 10 is an example of a printing device. The drive circuit 15 is an electronic circuit that drives a cutter motor 11 which operates a moving blade (not shown). The moving blade cuts the printed tape M discharged to an outside of the printing apparatus 18.

<Template>

Figure 2:
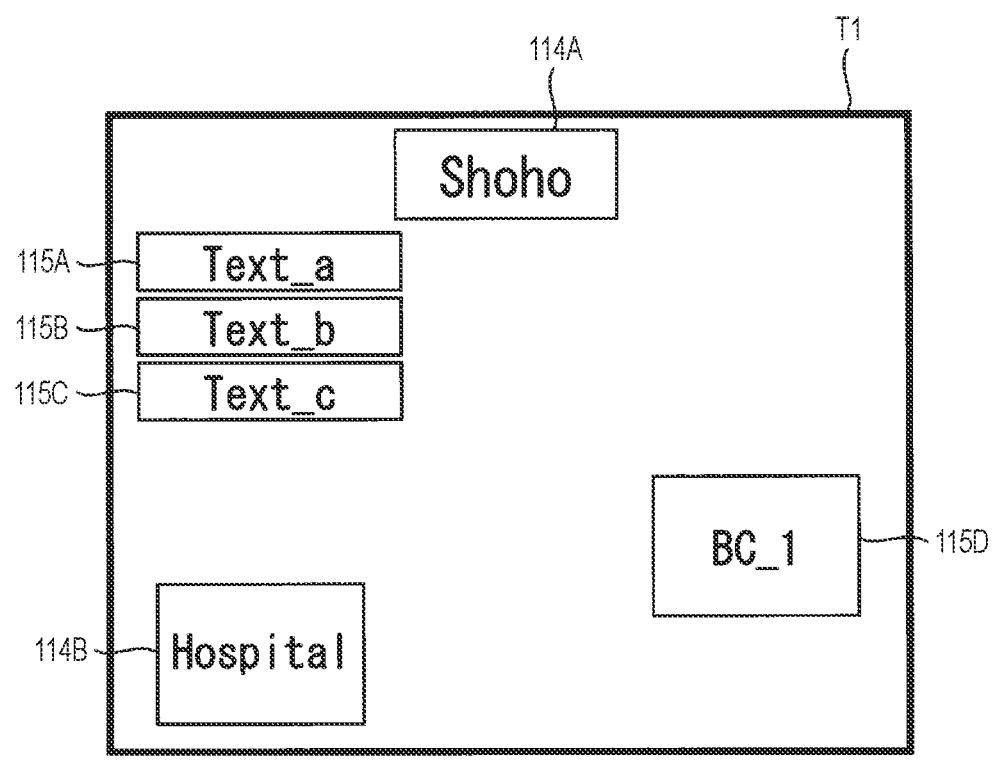
FIG. 2 is an explanatory diagram showing an example of a template.

FIG. 2 shows a template T1 which is an example of a template for creating a label image. In FIG. 2, in this example, the template T1 has a shape of a rectangle that is slightly wide in a lateral direction, and includes four objects 115A, 115B, 115C, and 115D. These objects 115A, 115B, 115C, and 115D are examples of the print objects.

<Object>

The object 115A having an object name "Text_a", the object 115B having an object name "Text_b", and the object 115C having an object name "Text_c" are included from top to bottom along a left side of the rectangle. In each of the objects 115A to 115C, object data to be incorporated therein is variable, and the user can input, through the input screen 33 (see FIG. 4 to be described later) to be described later, the object data to be incorporated.

The object 115D having an object name "BC_1" is included at a bottom near a right side of the rectangle. For example, two-dimensional barcode information, which is appropriately generated according to the object data incorporated into each of the objects 115A to 115C, is incorporated into the object 115D.

<Image>

The template T1 also includes, near a middle of an upper side of the rectangle, an image 114A having an image file name "Shoho", and also includes, near a lower left corner portion, an image 114B having an image file name "Hospital". An external appearance mode of each of the images 114A and 114B will be described later.

<Template Information>

FIG. 3 shows template information indicating a data structure of a template by taking a case of the template T1 as an example. As shown in FIG. 3, in this example, the template information includes: main body information; image information A and image information B related to the images 114A and 114B, respectively; and object information A, object information B, object information C, and object information D related to the objects 115A, 115B, 115C, and 115D, respectively.

<Main Body Information>

The main body information includes: a template ID that is identification information of the template T1; a width and a length of a print content of a print label L implemented by the template T1; and the number of objects included in the template T1. In this example, as illustrated, the template ID is "001", and the width and the length related to the template T1 are 36 mm and 50 mm, respectively. As described above, the number of objects is four. The template information is stored in the flash memory 25 in association with the template ID of each template.

<Image Information>

Each piece of image information includes: an image file name of a respective one of the images 114A and 114B; positions thereof in an X direction and a Y direction respectively corresponding to the lateral direction and a longitudinal direction in FIG. 2 described above; and a data type thereof. In this example, the position in the X direction and the position in the Y direction represent, in units of the number of dots corresponding to a predetermined resolution, positions of an upper left corner of each image with a predetermined position, for example, an upper left corner of the template in FIG. 2, as a reference point.

The image information A is information corresponding to the image 114A. In this example, the image file name is "Shoho.bmp", a position X is 160 dots, and a position Y is 10 dots. The data type is a bitmap image. The image information B is information corresponding to the image 114B. In this example, the image file name is "Hospital.bmp", a position X is 20 dots, and a position Y is 230 dots. The data type is a bitmap image.

<Object Information>

Each piece of object information includes: an object name of a respective one of the objects 115A to 115D; positions thereof in the X direction and the Y direction described above; a longitudinal size thereof along the Y direction; a lateral size thereof along the X direction; and a data type thereof. In this example, similarly to the image information, the position in the X direction and the position in the Y direction represent, in units of the number of dots corresponding to a predetermined resolution, positions of an upper left corner of each object with the predetermined position, for example, the upper left corner of the template in FIG. 2, as the reference point. Similarly, the longitudinal size and the lateral size are also represented in units of the number of dots.

The object information A is information corresponding to the object 115A. In this example, the object name is "Text_a", a position X is 15 dots, and a position Y is 70 dots. The longitudinal size is 20 dots and the lateral size is 150 dots. A display area of the object 115A is defined based on the longitudinal size and the lateral size. The data type is a text.

The object information B is information corresponding to the object 115B. In this example, the object name is "Text_b", a position X is 15 dots, and a position Y is 95 dots. The longitudinal size is 20 dots and the lateral size is 150 dots. A display area of the object 115B is defined based on the longitudinal size and the lateral size. The data type is a text.

The object information C is information corresponding to the object 115C. In this example, the object name is "Text_c", a position X is 15 dots, and a position Y is 120 dots. The longitudinal size is 20 dots and the lateral size is 150 dots. A display area of the object 115C is defined based on the longitudinal size and the lateral size. The data type is a text.

The object information D is information corresponding to the object 115D. In this example, the object name is "BC_1", a position X is 260 dots, and a position Y is 160 dots. The longitudinal size is 80 dots and the lateral size is 110 dots. A display area of the object 115D is defined based on the longitudinal size and the lateral size. The data type is a two-dimensional barcode.

Each piece of object information is stored in the flash memory 25 in association with the template ID of the corresponding template T.

<Input of Object Data>

Figure 4:
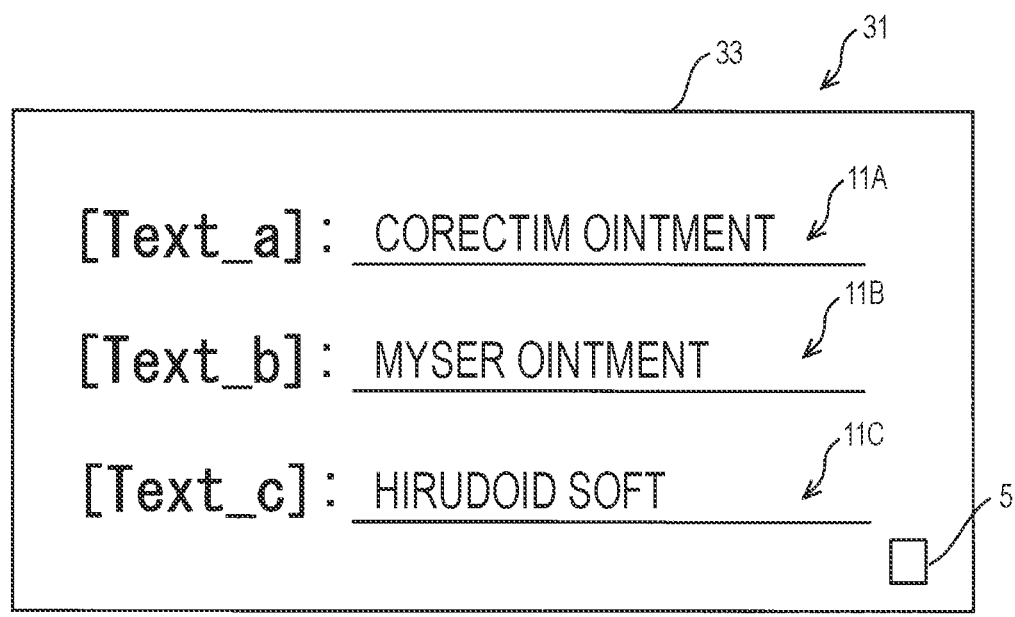
FIG. 4 is a diagram showing an example of an input screen for object data displayed on a display panel.

FIG. 4 shows an example of the input screen 33 for inputting the object data, by taking, as an example, a case of the object data incorporated into each of the objects 115A to 115C of the template T1 described above.

In FIG. 4, the input screen 33 includes three input portions 11A, 11B, and 11C in this example. For example, the user appropriately operates the operation device 7 to display an appropriate template selection screen on the display panel 31, and to select and read out the template T1 from the plurality of templates T stored in the flash memory 25. Then, the user further appropriately operates the operation device 7 to display the input screen 33 on the display panel 31, to select the input portions 11A, 11B, and 11C, and to input the object data.

The object names "Text_a", "Text_b", and "Text_c" of the corresponding objects 115A, 115B, and 115C are respectively written on left sides of the input portions 11A, 11B, and 11C. That is, the object data input to the input portion 11A is incorporated into the object 115A. The object data input to the input portion 11B is incorporated into the object 115B. The object data input to the input portion 11C is incorporated into the object 115C.

In the illustrated example, the user operates the operation device 7, so that a text of "CORECTIM OINTMENT" is input to the input portion 11A as the object data intended to be incorporated into the object 115A. A text of "MYSER OINTMENT" is input to the input portion 11B as the object data intended to be incorporated into the object 115B. A text of "HIRUDOID SOFT" is input to the input portion 11C as the object data intended to be incorporated into the object 115C. After the user inputs the desired object data to each of the input portions 11A to 11C as described above, the user operates an execution button 5 via the operation device 7, so that the object data is incorporated into each of the objects 115A to 115C of the template T1.

<Input Performed by Barcode Reader>

Input of the object data to each of the input portions 11A to 11C may be performed by a barcode reader BR instead of being performed by manual input via the operation device 7 as described above. In this case, for example, a barcode formed correspondingly to the text of "CORECTIM OINTMENT" is prepared in advance, and the barcode is scanned with the barcode reader BR, so that the text of "CORECTIM OINTMENT" is automatically input to the input portion 11A. Similarly, a barcode corresponding to the text of "MYSER OINTMENT" and prepared in advance is scanned with the barcode reader BR, so that the text of "MYSER OINTMENT" is automatically input to the input portion 11B. A barcode corresponding to the text of "HIRUDOID SOFT" and prepared in advance is scanned with the barcode reader BR, so that the text of "HIRUDOID SOFT" is automatically input to the input portion 11C. In this case, an execution barcode having the same function as that of the execution button 5 may be prepared in advance. In this case, the object data is incorporated into each of the objects 115A to 115C of the template T1, for example, by scanning the execution barcode when the input to each of the input portions 11A to 11C is completed by the scanning. Hereinafter, a case where the object data is input by the barcode reader BR in this way will be mainly described as an example.

<Reflection in Template>

Figure 5:
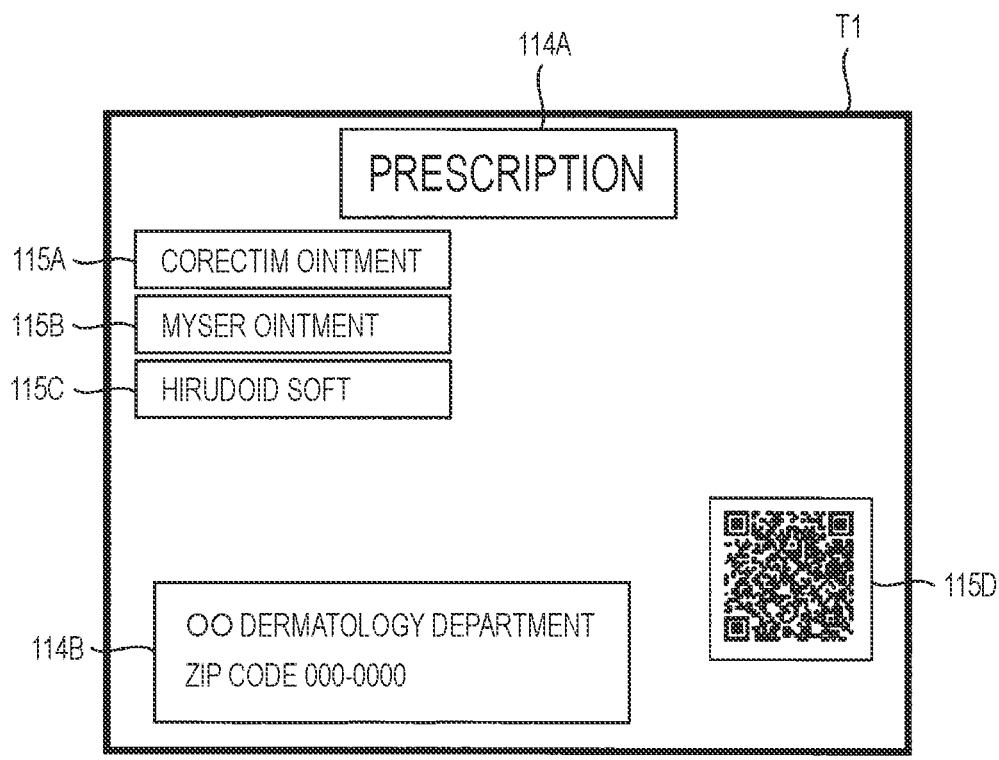
FIG. 5 is an explanatory diagram showing an example of the template in which object data is reflected.

A state where incorporation of the object data into each object is performed as described above and reflected in the template T is shown in FIG. 5 by taking, as an example, a case of the objects 115A to 115C of the template T1 described above.

As shown in FIG. 5, as a result of the input performed by the barcode reader BR described above, the object data of the text of "CORECTIM OINTMENT" is inserted into the object 115A. The object data of the text of "MYSER OINTMENT" is inserted into the object 115B. The object data of the text of "HIRUDOID SOFT" is inserted into the object 115C.

In this example, object data is not inserted into each of the objects 115A to 115C in an initial state of the template T1 as described above, and the object data input as described above is inserted into each of the objects 115A to 115C. However, the present disclosure is not limited to the mode. That is, appropriate initial object data may be inserted into each of the objects 115A to 115C in the initial state, and then the input object data may be inserted into each of the objects 115A to 115C to replace the initial object data. A case of referring to "incorporation of the object data" or the like in the description of the application includes both new insertion of the object data and replacement of the initial object data with the input object data.

FIG. 5 also shows the external appearance mode of each of the images 114A and 114B described above. The image 114A corresponding to the image file name "Shoho.bmp" has a mode in which a text of "PRESCRIPTION" is written as illustrated. The image 114B corresponding to the image file name "Hospital.bmp" has a mode in which a text of "○○ DERMATOLOGY DEPARTMENT, ZIP CODE 000-0000" is written as illustrated. Furthermore, FIG. 5 also shows an external appearance mode of the object 115D described above. As described above, the two-dimensional barcode information, which is generated according to the object data incorporated into each of the objects 115A to 115C, is incorporated into the object 115D. In this example, the object 115D has a mode in which an illustrated two-dimensional barcode corresponding to the "CORECTIM OINTMENT", the "MYSER OINTMENT", and the "HIRUDOID SOFT" is written.

<Print Label>

The print label L printed by the printing apparatus 18 by using the template T as described above is shown in FIG. 6 by taking, as an example, a print label L1 generated by using the template T1 described above. The printing is executed by an appropriate printing instruction operation via the operation device 7 or via scanning with the barcode reader BR in a state where incorporation or the like of the object data is reflected.

Figure 6:
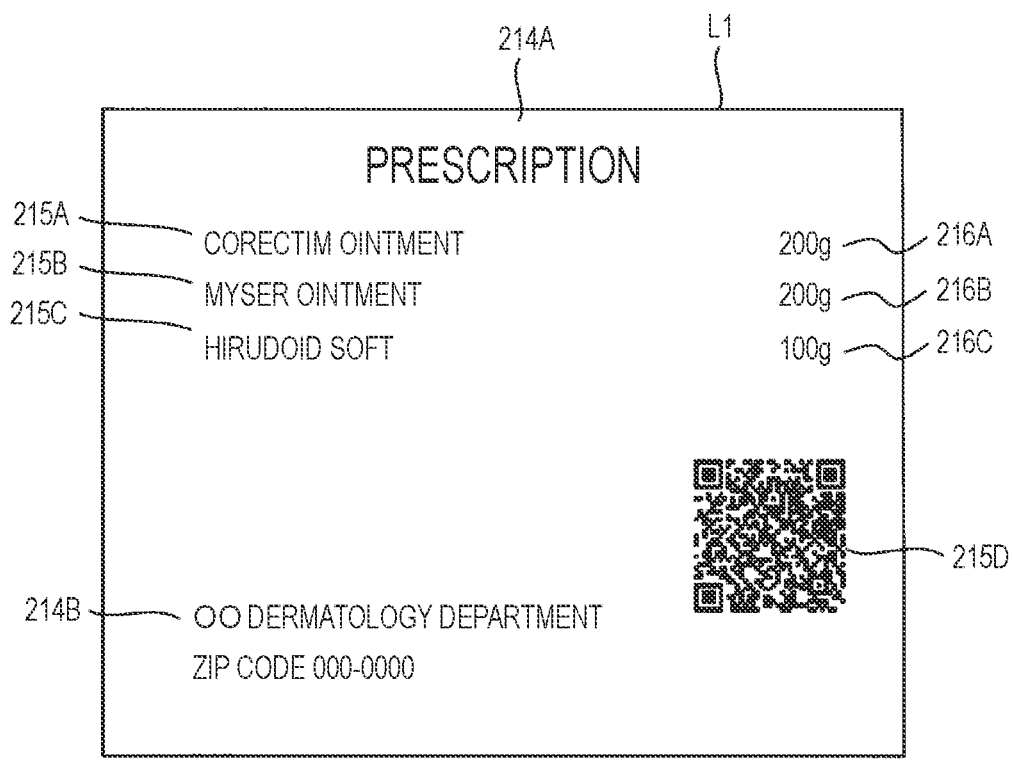
FIG. 6 is a diagram showing an external appearance of an example of a print label generated by using the template.

The print label L1 shown in FIG. 6 is used as a prescription issued by a hospital. In the print label L1 in FIG. 6, prints 215A, 215B, and 215C of "CORECTIM OINTMENT", "MYSER OINTMENT", and "HIRUDOID SOFT" are formed correspondingly to the objects 115A, 115B, and 115C into which the object data are incorporated. In this example, a print 216A of "200 g" that is an amount of the "CORECTIM OINTMENT" is formed, a print 216B of "200 g" that is an amount of the "MYSER OINTMENT" is formed, and a print 216C of "100 g" that is an amount of the "HIRUDOID SOFT" is formed. Contents of the prints 216A, 216B, and 216C are input to the printing apparatus 18 by the user performing an appropriate operation via an operation device or via scanning with the barcode reader BR before the printing instruction described above is performed.

In the print label L1, prints 214A and 214B of "PRESCRIPTION" and "○○ DERMATOLOGY DEPARTMENT, ZIP CODE 000-0000" are formed correspondingly to the images 114A and 114B described above. Furthermore, a print 215D of the two-dimensional barcode corresponding to the object 115D described above is formed.

Features of Aspect of Present Disclosure

Features of the aspect of the present disclosure lie in a process when the plurality of templates T are read out from the flash memory 25 to generate separate print labels L. Hereinafter, details thereof will be described in order.

BACKGROUND

Figure 7:
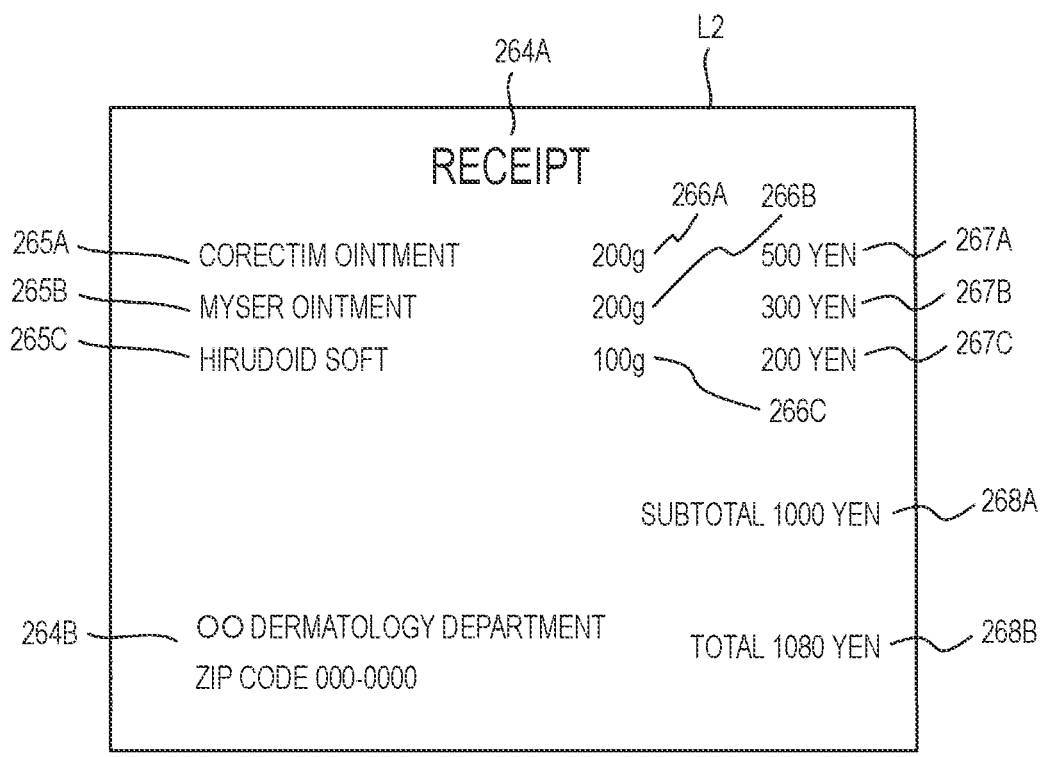
FIG. 7 is a diagram showing an external appearance of another example of a print label generated by using a template.
Figure 8:
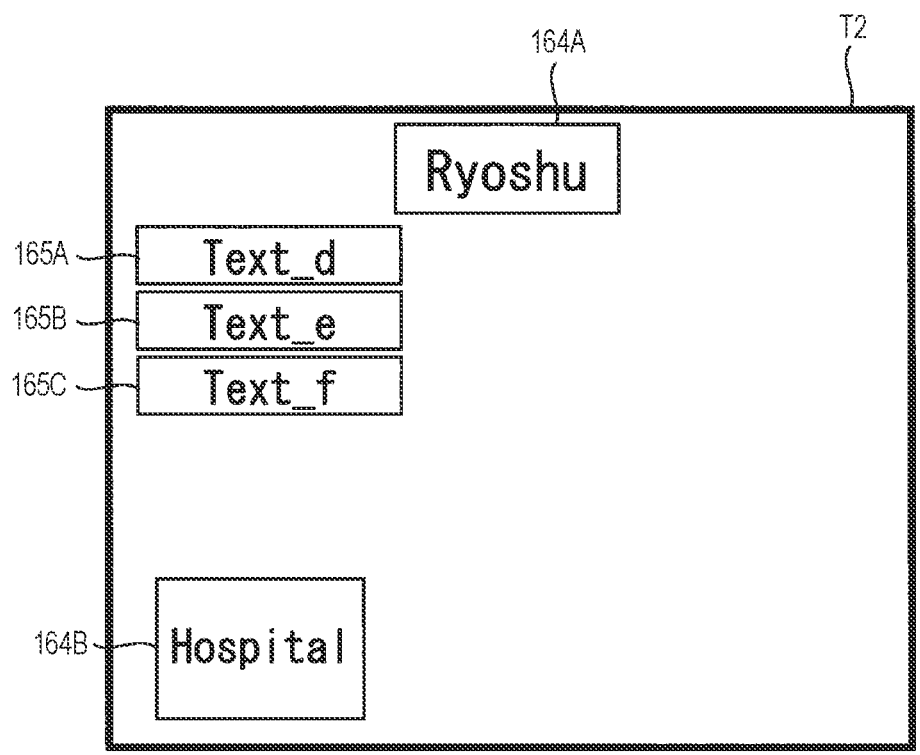
FIG. 8 is an explanatory diagram showing a template of a comparative example used to generate the print label in FIG. 7.

For example, the different print labels L may be desired to be produced by performing printing using the same object data in common for the plurality of different templates T. FIG. 7 shows, as such an example, an example of a print label L2 issued as a receipt by the hospital correspondingly to the print label L1 that is the prescription. FIG. 8 shows an example of a template T2 used for printing the print label L2. The template T2 is a comparative example with respect to a template T0 which will be described later and which is used in the aspect of the present disclosure in order to print the print label L2.

In FIG. 8, the template T2 has the same shape as that of the template T1 shown in FIG. 2. The template T2 includes an object 165A having an object name "Text_d", an object 165B having an object name "Text_e", and an object 165C having an object name "Text_f", similarly to the objects 115A to 115C. The objects 165A, 165B, and 165C are also examples of the print objects. The template T2 also includes an image 164A having an image file name "Ryoshu" similarly to the image 114A, and also includes an image 164B having an image file name "Hospital" similarly to the image 114B of the template T1.

During production of the print label L2, the user uses the input screen 33 or the barcode reader BR to incorporate the object data of "CORECTIM OINTMENT", "MYSER OINTMENT", and "HIRUDOID SOFT" into the objects 165A, 165B, and 165C. As a result, in the print label L2 in FIG. 7, prints 265A, 265B, and 265C of "CORECTIM OINTMENT", "MYSER OINTMENT", and "HIRUDOID SOFT" are formed correspondingly to the objects 165A, 165B, and 165C into which the object data are incorporated. In the print label L2, prints 264A and 264B of "RECEIPT" and "○○ DERMATOLOGY DEPARTMENT, ZIP CODE 000-0000" are formed correspondingly to the images 164A and 164B described above.

In this example, similarly to the print label L1, a print 266A of "200 g" that is an amount of the "CORECTIM OINTMENT", and a print 267A of "500 YEN" that is a received amount of money corresponding to the amount are formed by an operation of the user using the operation device or the barcode reader BR. Similarly, a print 266B of "200 g" that is an amount of the "MYSER OINTMENT" and a print 267B of "300 YEN" that is a received amount of money corresponding to the amount are formed. Similarly, a print 266C of "100 g" that is an amount of the "HIRUDOID SOFT" and a print 267C of "200 YEN" that is a received amount of money corresponding to the amount are formed. Furthermore, a print 268A of "SUBTOTAL 1000 YEN" based on totaling of the respective amounts of money and a print 268B of "TOTAL 1080 YEN" obtained by adding a predetermined tax or the like to the amounts of money are formed.

For example, when the print labels L1 and L2 are sequentially produced, it is necessary to input the object data to the respective objects of each of the templates T1 and T2 after reading out the templates T1 and T2 as described above. Therefore, the object data of "CORECTIM OINTMENT", "MYSER OINTMENT", and "HIRUDOID SOFT" are repeatedly input to both the template T1 for the print label L1 and the template T2 for the print label L2, and an operation is complicated.

Method of Aspect of Present Disclosure

In response to the above, in the aspect of the present disclosure, even if the separate templates T are different from each other, when there are objects to which the same object data is input in common, object names thereof are set to be the same. After the print label L is produced by inputting object data to one object of one template T, the same object data is automatically input to an object of another template T having the same name as that of the one object.

Figure 9A:
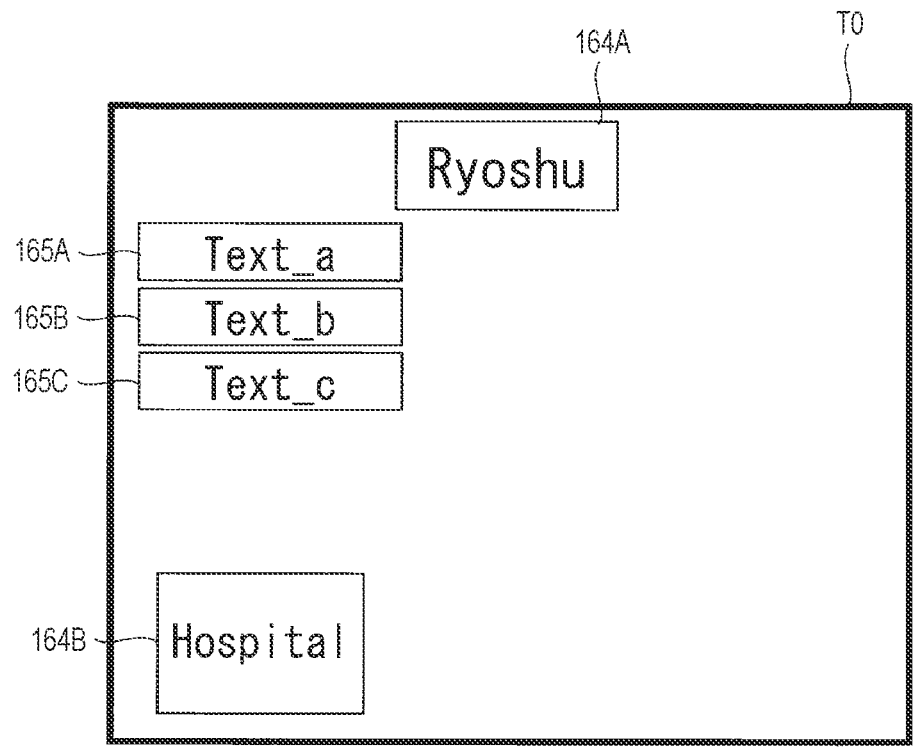
FIG. 9A is an explanatory diagram showing a template of an aspect of the present disclosure used to generate the print label in FIG. 7.

FIG. 9A shows an example of the template T0 used in the aspect of the present disclosure during production of the print label L2 corresponding to the print label L1 according to the above example. That is, it is known in advance that the prints 265A to 265C on the print label L2 that is the receipt have the same contents as those of the prints 215A to 215C on the print label L1 that is the prescription. In response to this, in the template T0 for the print label L2 shown in FIG. 9A, an object name of an object 165A is set to "Text_a" which is the same as that of the object 115A of the template T1 for the print label L1. Similarly, an object name of an object 165B is set to "Text_b", and an object name of an object 165C of the template T0 is set to "Text_c".

Figure 9B:
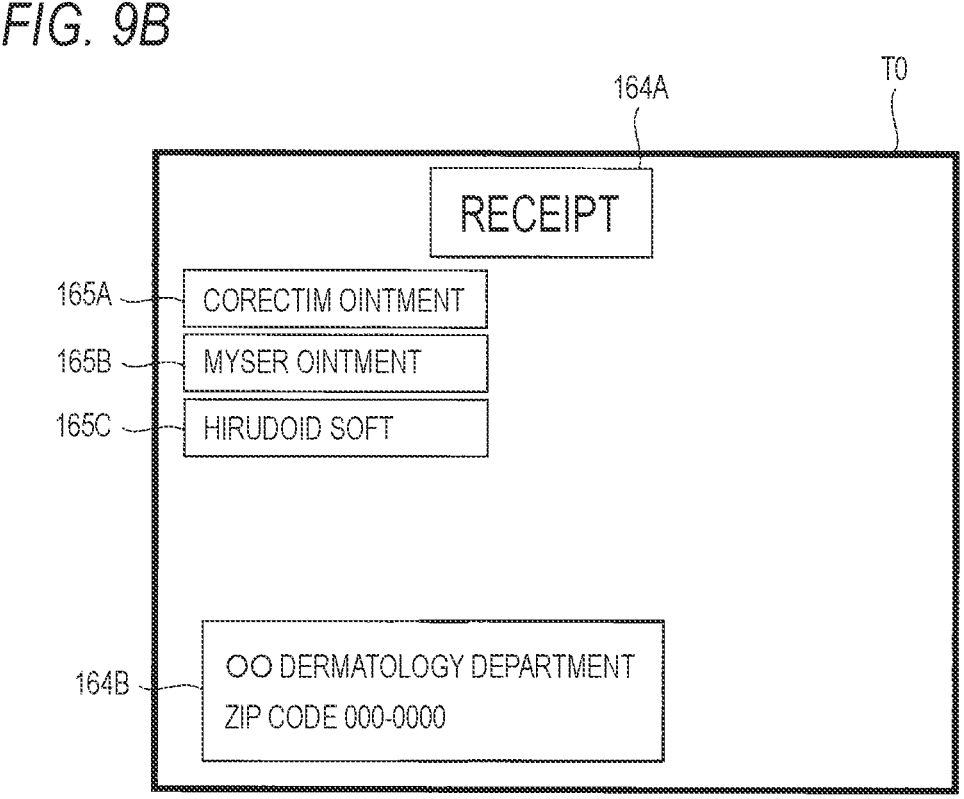
FIG. 9B is an explanatory diagram showing a state where object data is incorporated into the template in FIG. 9A.

As a result, the object data stored respectively correspondingly to the objects 115A, 115B, and 115C during printing of the print label L1 are automatically incorporated into the objects 165A, 165B, and 165C. That is, as shown in FIG. 9B, in the object 165A having "Text_a", "CORECTIM OINTMENT" associated with the object 115A having the same "Text_a" (see FIG. 5 described above. The same applies hereinafter) is incorporated. In the object 165B having the object name "Text_b", "MYSER OINTMENT" associated with the object 115B having the same object name "Text_b" is incorporated. In the object 165C having the object name "Text_c", "HIRUDOID SOFT" associated with the object 115C having the same object name "Text_c" is incorporated.

<Control Procedure>

A control procedure executed by the CPU 21 in order to realize the above method will be described with reference to a flowchart of FIG. 10.

In S5, selection of a first template T from the plurality of templates T stored in the flash memory 25 is received by, for example, an operation on the operation device 7 in a state where the template selection screen is displayed on the display panel 31. The template T whose selection is received is read out from the flash memory 25. The first template T is an example of a first template, and a process executed by the CPU 21 in S5 is an example of a first selection reception process.

In S10, in order to produce a first print label L, object data to be incorporated into each object of the template T selected in S5 is acquired from an outside of the CPU 21 by, for example, scanning with the barcode reader BR. In S15, the object data acquired in S10 is stored in the object data storage area 24A. The first print label L is an example of a first printed matter, the object data acquired from the outside is an example of first print data, and a process executed by the CPU 21 in S10 and S15 is an example of a first print data acquisition process.

In S20, the object data acquired in S10 is incorporated into the object included in the template T read out in S5. The object is an example of a first print object, and a process executed by the CPU 21 in S20 is an example of a first incorporation process.

In S25, an appearance of the template T in a state where the object data is incorporated in S20 into the template T read out in S5 is displayed on the display panel 31.

In S30, it is determined whether the printing instruction operation described above has been performed by the user who has viewed contents displayed in S25. If the printing instruction operation has been performed, a determination of Yes is made, and the process proceeds to S35. In S35, printing is performed by using the template T into which the object data is incorporated in S20, and the corresponding first print label L is produced. A process executed by the CPU 21 in S35 is an example of a first printing process.

Then, in S40, similarly to S5, selection of a second template T from the plurality of templates T is received by an operation in the state where the template selection screen is displayed on the display panel 31. The template T whose selection is received is read out from the flash memory 25. The second template T is an example of a second template, and a process executed by the CPU 21 in S40 is an example of a second selection reception process.

In S45, it is determined whether an object included in the second template T read out in S40 and the object included in the first template T satisfy a predetermined association rule. According to the example described above, the association rule in this case is whether object names are the same. That is, it is determined in S45 whether the name of the object included in the second template T matches the name of the object included in the first template T. The object included in the second template T is an example of a second print object, and the name of the object is an example of second identification information. The name of the object included in the first template T is an example of first identification information.

The object name of the object of the second template T and the object name of the object of the first template T may have a character string in common as another example of the association rule. That is, in this case, it is determined in S45 whether the two object names are at least partially common to each other. According to the example described above, this case corresponds to a case where the name of the object 115A included in the first template T1 is "Text_a" and the name of the object included in the other second template T2 is "Text_a1", or the like. In this case, "Text_a" is an example of the first identification information, and "Text_a1" is an example of the second identification information. For example, a case where characters on an end side match characters on a beginning side as in a case where the object name related to the first template T is "PQR" and the object name related to the second template T is "QRS" is also considered. In this case, "PQR" is an example of the first identification information, and "QRS" is an example of the second identification information. Furthermore, for example, a case where the object names match in terms of characters of components and do not match in terms of order as in a case where the object name related to the first template T is "PQR" and the object name related to the second template T is "RQP" is also considered. In this case, "PQR" is an example of the first identification information, and "RQP" is an example of the second identification information.

Furthermore, when each of the object names includes an order identifier indicating a production order rule of two print labels L, it is also possible to determine whether the association rule is satisfied by taking the order identifier into consideration as follows.

That is, for example, when the object name related to the first template T is "Text_1a" and the object name related to the second template T is "Text_1b", there is a portion of "Text_1" common to both of the object names. A flow of an additional character portion "a" "b" matches an alphabetical order. Therefore, it is determined that the association rule is satisfied, and the object data incorporated into the object of the first template T having "Text_1a" is also incorporated into the object of the second template T having "Text_1b" (see S50 to be described later). In this case, "Text_1a" is an example of the first identification information, and "Text_1b" is an example of the second identification information. On the other hand, for example, when the object name related to the first template T is "Text_1b" and the object name related to the second template T is "Text_1a", there is a portion of "Text_1" common to both of the object names. However, a flow of an additional character portion "b" "a" do not match the alphabetical order. Therefore, in this case, it is determined that the association rule is not satisfied, and the object data incorporated into the object of the first template T having "Text_1b" can be prevented from being incorporated into the object of the second template T having "Text_1a". In this case, "Text_1b" is an example of the first identification information, and "Text_1a" is an example of the second identification information.

A process executed by the CPU 21 in S45 as described above is an example of an association determination process. If the object included in the second template T and the object included in the first template T satisfy the association rule, a determination of Yes is made, and the process proceeds to S50.

In S50, in the object included in the second template T, the object data stored in S15 is incorporated which is the same data as that incorporated into the corresponding object of the first template T. A process executed by the CPU 21 in S50 is an example of a second incorporation process.

In S55, similarly to S25, an appearance in a state where the object data is incorporated in S50 into the second template T read out in S40 is displayed on the display panel 31.

In S60, similarly to S30, it is determined whether or not the printing instruction operation described above has been performed by the user who has viewed contents displayed in S55. When the printing instruction operation has been performed, a determination of Yes is made, and the process proceeds to S65. In S65, similarly to S35, printing is performed by using the template T into which the object data is incorporated in S50, and a corresponding second print label L is produced. The second print label L is an example of a second printed matter, and a process executed by the CPU 21 in S65 is an example of a second printing process.

On the other hand, in S45, if the object included in the second template T and the object included in the first template T do not satisfy the association rule, a determination of No is made, and the process proceeds to S70.

In S70, similarly to S10, new object data to be incorporated into the object included in the second template T is acquired from the outside of the CPU 21 by, for example, scanning with the barcode reader BR. The object data acquired from the outside is an example of second print data, and a process executed by the CPU 21 in S70 is an example of a second print data acquisition process.

In S75, the object data acquired in S70 is incorporated into the object included in the second template T. A process executed by the CPU 21 in S75 is an example of a third incorporation process.

In S80, similarly to S25 and S55, an appearance in a state where the object data is incorporated in S75 into the second template T read out in S40 is displayed on the display panel 31.

In S85, similarly to S30 and S60, it is determined whether the printing instruction operation described above has been performed by the user who has viewed contents displayed in S80. When the printing instruction operation has been performed, a determination of Yes is made, and the process proceeds to S90. In S90, similarly to S35 and S65, printing is performed by using the template T into which the object data is incorporated in S75, and the corresponding second print label L is produced. A process executed by the CPU 21 in S90 is an example of a third printing process.

Effects of Aspect of Present Disclosure

As described above, in the aspect of the present disclosure, the plurality of templates T are stored in the flash memory 25. The user can select a desired template T from the plurality of templates T and allocate appropriate object data to the object included in the selected template T so as to generate a desired print label L. When the user allocates the same object data to the plurality of templates T to produce a plurality of print labels L, a process capable of reducing an operation burden on the user is performed under control of the CPU 21. That is, during generation of the first print label L, selection of the template T1 selected by the user among the plurality of templates T stored in the flash memory 25 is received in S5. Then, in S10 and S15, the object data for the first print label L1 is acquired. The acquired object data is stored in the object data storage area 24A. Thereafter, in S20, the acquired object data is incorporated into the object of the first template T1. In S35, the printing is performed by using the first template T1 into which the object data is incorporated as described above, and the first print label L1 is generated. During generation of the second print label L2 after generation of the first print label L1, selection of the second template T0 selected by the user among the plurality of templates is received in S40. Thereafter, in S45, it is determined whether the object of the second template T0 and the object of the first template T1 satisfy the predetermined association rule. If the association rule is satisfied, the object data stored in the object data storage area 24A is read out in S50, and the read object data is incorporated into the object of the second template T0. Thereafter, in S65, the printing is performed by using the second template T0 into which the object data is incorporated as described above, and the second print label L2 is generated. In the aspect of the present disclosure, after the print label L1 is generated by incorporating the object data into the first template T1 as described above, it is possible to generate the print label L2 by incorporating the object data into the second template T0 without newly inputting the object data again. Therefore, according to the aspect of the present disclosure, it is possible to reduce the operation burden on the user when the printing is desired to be performed by using the same object data in common for the plurality of different templates T. It is also possible to prevent occurrence of an error that contents partially different are erroneously input when the same object data is repeatedly input.

In the aspect of the present disclosure, in particular, in S45, it is determined whether identification information of the object of the first template T1 and identification information of the object of the second template T0 satisfy the predetermined association rule. In the example described above, the identification information is an object name. According to the aspect of the present disclosure, based on identification information of the objects included in the plurality of templates T, it is possible to smoothly determine whether the objects are associated with each other in advance by the association rule.

In the aspect of the present disclosure, in particular, in S45, it is also possible to determine whether the identification information of the object of the first template T1 and the identification information of the object of the second template T0 have a character string in common. In this case, based on the identification information of the objects included in the plurality of templates T, it is possible to easily determine whether the objects are associated with each other in advance by the association rule.

In the aspect of the present disclosure, in particular, in S45, it is also possible to determine whether each of the identification information of the object of the first template T1 and the identification information of the object of the second template T0 includes an order identifier corresponding to a production order rule of the print labels L1 and L2. In this case, based on the identification information of the objects in the templates T, it is possible to perform processes by distinguishing a case where the same object data should be allocated to the objects of the two templates T1 and T0 from a case where the same object data should not be allocated to the objects of the two templates T1 and T0 in accordance with a production order of the two print labels L1 and L2.

In the aspect of the present disclosure, in particular, the printing apparatus 18 includes the barcode reader BR, and the object data based on reading performed by the barcode reader is acquired in S10 and S15. According to the aspect of the present disclosure, the user can easily input the object data to be incorporated into the objects of the templates T1 and T0 only by performing desired reading by using the barcode reader BR.

In the aspect of the present disclosure, in particular, if it is determined in S45 that the object of the first template T1 and the object of the second template T0 do not satisfy the predetermined association rule, S70, S75, and S90 are performed to generate the second print label L2. The object data for the print label L2 is acquired in S70, and the acquired object data is incorporated into the object of the second template T0 in S75. In S90, the printing is performed by using the template T0 into which the object data is incorporated as described above, and the print label L2 is generated. According to the aspect of the present disclosure, if the object of the first template T1 and the object of the second template T0 are not associated with each other by the predetermined association rule, the print label L2 can be generated by a method in the related art.

In the above description, each of arrows shown in FIG. 1 indicates an example of a flow of a signal, and does not limit a flow direction of the signal.

Figure 10:
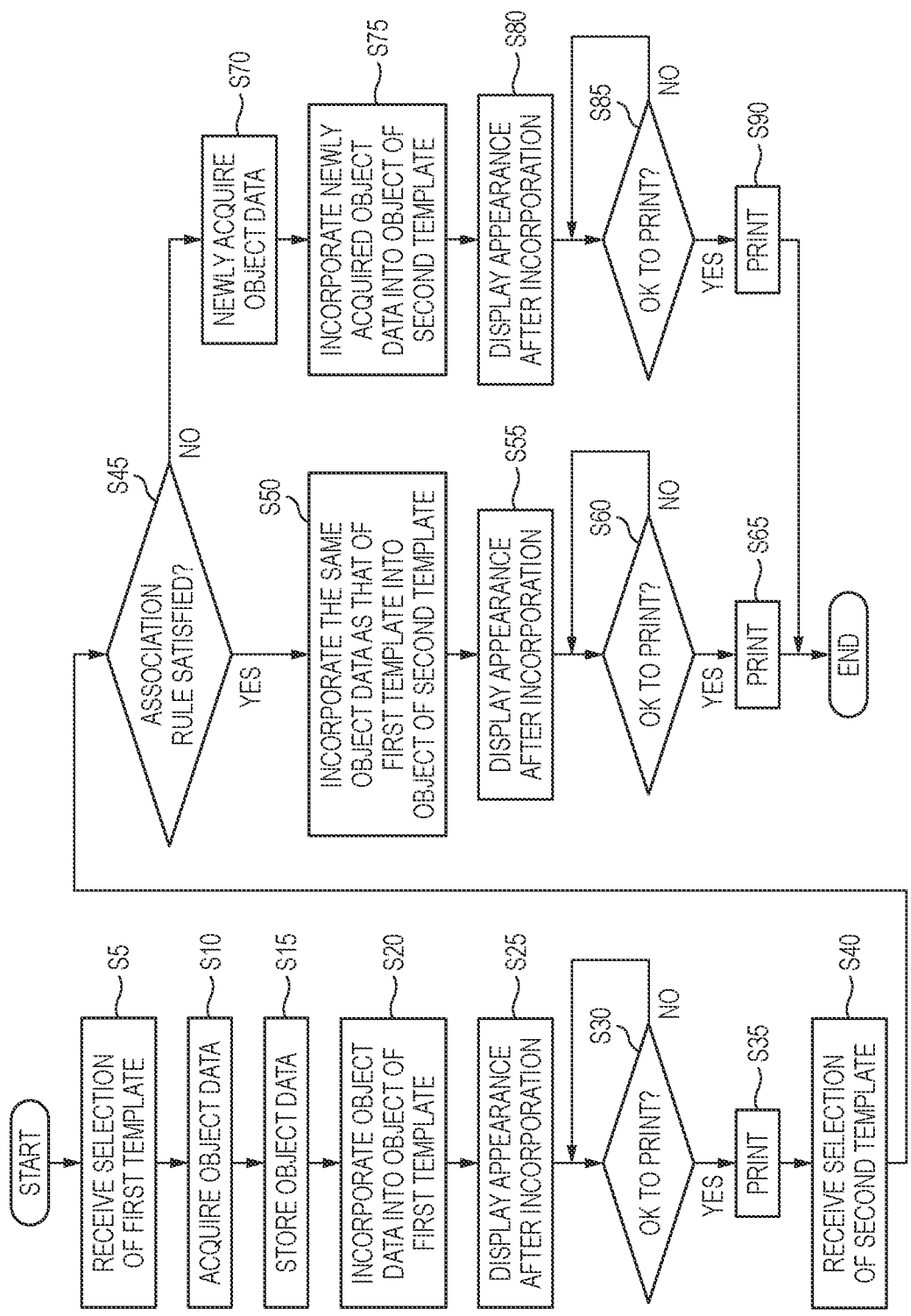
FIG. 10 is a flowchart showing a control procedure executed by a CPU.

The flowchart shown in FIG. 10 does not limit the present disclosure to the procedure shown in the above flow, and addition or deletion of procedures, change of an order thereof, or the like may be made within a range not departing from a gist and a technical idea of the aspect of the present disclosure.

In addition to those described above, methods according to the above aspect and modifications may be appropriately combined and used.

Although not individually shown by examples, the present disclosure can be implemented with various changes made within a range not departing from the gist thereof

What is claimed is:

1. Printing apparatus for generating a printed matter by using a template in which a print object is allocated, the printing apparatus comprising:
a first storage device, the first storage device being configured to include a first template in which a first print object is allocated and a second template in which a second print object is allocated, the first print object being configured to be incorporated into the first template, the second print object being configured to be incorporated into the second template;
a second storage device;
a printing device; and
a controller,
wherein the controller is configured to execute:
a first selection reception process of receiving selection of the first template stored in the first storage device;
a first print data acquisition process of acquiring, from an outside of the controller, first print data for a first printed matter to be generated by using the first template, and storing the first print data in the second storage device;
a first incorporation process of incorporating the first print data as object data for the first print object into the first print object of the first template selected in the first selection reception process;
a first printing process of performing, by using the first template in which the first print data is incorporated in the first incorporation process, printing by the printing device, thereby generating the first printed matter;
a second selection reception process of receiving, after the first printing process, selection of the second template stored in the first storage device;
an association determination process of determining whether the second print object of the second template selected in the second selection reception process satisfies a predetermined association rule with respect to the first print object of the first template selected in the first selection reception process;
a second incorporation process of, when it is determined in the association determination process that the second print object satisfies the predetermined association rule with respect to the first print object, incorporating the first print data stored in the second storage device, as object data for the second print object into the second print object of the second template; and
a second printing process of performing, by using the second template in which the first print data is incorporated in the second incorporation process, printing by the printing device, thereby generating a corresponding second printed matter.

2. The printing apparatus according to claim 1, wherein the controller is configured to, in the association determination process, determine whether first identification information of the first print object and second identification information of the second print object satisfies the predetermined association rule.

3. The printing apparatus according to claim 2, wherein the controller is configured to, in the association determination process, determine whether the first identification information and the second identification information have a character string in common as the association rule.

4. The printing apparatus according to claim 3, wherein the controller is configured to, in the association determination process, determine whether each of the first identification information and the second identification information includes an order identifier, the order identifier corresponding to a production order rule of the first printed matter and the second printed matter as the association rule.

5. The printing apparatus according to claim 1, further comprising:
a barcode reader,
wherein the controller is further configured to acquire, in the first print data acquisition process, the first print data based on a reading result of the barcode reader.

6. The printing apparatus according to claim 1,
wherein when it is determined in the association determination process that the second print object does not satisfy the predetermined association rule with respect to the first print object, the controller is further configured to execute:
- a second print data acquisition process of acquiring second print data for the second printed matter to be generated by using the second template;
- a third incorporation process of incorporating the second print data acquired in the second print data acquisition process, as object data for the second print object, into the second print object of the second template; and
- a third printing process of performing, by using the second template in which the second print data is incorporated, printing by the printing device, thereby generating the corresponding second printed matter.

* * * * *